United States Patent
Goossens

(10) Patent No.: US 10,055,897 B2
(45) Date of Patent: *Aug. 21, 2018

(54) SYSTEMS, METHODS, AND COMPUTER-READABLE MEDIA FOR PLACING AN ASSET ON A THREE-DIMENSIONAL MODEL

(71) Applicant: APPLE INC., Cupertino, CA (US)

(72) Inventor: Thomas Goossens, Paris (FR)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,546

(22) Filed: Dec. 12, 2016

(65) Prior Publication Data

US 2017/0154473 A1 Jun. 1, 2017

Related U.S. Application Data

(63) Continuation of application No. 12/892,636, filed on Sep. 28, 2010, now Pat. No. 9,519,396.

(51) Int. Cl.
*G06T 19/20* (2011.01)
*G06F 3/0481* (2013.01)

(52) U.S. Cl.
CPC .......... *G06T 19/20* (2013.01); *G06F 3/04815* (2013.01); *G06T 2200/04* (2013.01); *G06T 2200/24* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 5,463,722 A | 10/1995 | Venolia | |
| 5,490,080 A | 2/1996 | Jarrige et al. | |
| 6,448,964 B1 | 9/2002 | Isaacs et al. | |
| 6,853,383 B2 | 2/2005 | Duquesnois | |
| 7,098,911 B2 | 8/2006 | Chen et al. | |
| 7,538,782 B2 | 5/2009 | Kuroki et al. | |
| 8,103,128 B2 | 1/2012 | Aonuma et al. | |
| 2008/0092110 A1 | 4/2008 | Kawahara et al. | |
| 2009/0138377 A1 | 5/2009 | Oh et al. | |
| 2011/0041098 A1 | 2/2011 | Kajiya et al. | |
| 2012/0079377 A1 | 3/2012 | Goossens | |

OTHER PUBLICATIONS

Foley et. al., Compuer Graphics Principles and Practice: Second Edition in C, Jul. 1997, Addison-Wesley Systems Programming Series, 236-247.
dHaussy, Nicholas, Object Spreading Methods, 2008, http://www.cgarena.com/freestuff/tutorials/maya/objectSpreading/index.html, 1 -14.
Dempski, Kelley, Focus on Curves and Surfaces, 2002 Course Technology, 137-140.

*Primary Examiner* — Ryan M Gray
(74) *Attorney, Agent, or Firm* — Invoke

(57) ABSTRACT

Systems, methods, and computer-readable media are provided for placing an asset on a three-dimensional model. Each asset can be associated with a pivot point and with an asset normal. A contact point on the surface of a model where an asset is to be positioned may be identified, and a surface normal that may be perpendicular to the surface at the contact point may also be identified. Then, the asset can be placed on the model such that the position of the pivot point of the asset may coincide with the position of the identified contact point on the surface of the model, and such that the orientation of the asset normal may match the orientation of the identified surface normal.

21 Claims, 10 Drawing Sheets

SYSTEMS, METHODS, AND COMPUTER-READABLE MEDIA FOR PLACING AN ASSET ON A THREE-DIMENSIONAL MODEL

CROSS-REFERENCE TO RELATED APPLICATIONS

This application is a continuation of U.S. application Ser. No. 12/892,636, filed Sep. 28, 2010, entitled "Systems, Methods, And Computer-Readable Media For Placing An Asset On A Three-Dimensional Model," the content of which is incorporated herein by reference in its entirety.

BACKGROUND

Some electronic devices can display three-dimensional models that a user can control as part of an electronic device operation. For example, gaming consoles can display three-dimensional avatars that represent a user, and the user can direct the avatar to perform specific actions in a game. The three-dimensional models can be constructed from the combination of several assets such as a body, a head, eyes, ears, nose, hair, glasses, a hat, or other accessories. The assets can be placed on and incorporated into the model (e.g., placed on and integrated into an external surface of the model), or placed adjacent to the external surface of the model. To enhance the user's experience, the user can personalize a displayed model by selecting and moving specific assets with respect to the remainder of the model.

SUMMARY

Systems, methods, and computer-readable media for positioning and orienting movable assets on a three-dimensional model are provided.

An electronic device can display a three-dimensional model (e.g., an avatar) that may be constructed from several assets. For example, fashion accessory assets (e.g., glasses) can be placed on an external surface of a head asset of the model. Each asset can be placed or disposed on the model in a manner that may ensure that the position and orientation of the asset relative to other portions of the model are consistent when viewed from different angles. When a user moves an asset with respect to the remainder of the model, for example, by dragging the asset, the asset can move in a manner that maintains a consistent asset position and orientation with respect to other portions of the model.

To ensure that the position and orientation of an asset with respect to a model are consistent when viewed from different angles when the placement of the asset is moved to a particular contact point along a surface of the model, each asset can include a pivot point and an asset normal. The pivot point can define a point of the asset, and the pivot point may have a consistent positional relationship with respect to any particular contact point along an external surface of a model on which the asset is to be placed. The asset normal can correspond to a direction with respect to the pivot point of the asset providing an orientation for the asset, and the asset normal may have a consistent orientational relationship with respect to a surface normal at any particular contact point along an external surface of a model on which the asset is to be placed. The asset normal may not necessarily be perpendicular to a particular surface of the asset. When a user provides an instruction to place or move an asset with respect to a model, a particular contact point on the external surface of the model that corresponds to the user-provided instruction may be identified. A surface normal corresponding to the identified contact point may also be identified, and may include a line that passes through the identified contact point and that is perpendicular to a plane tangent to the external surface of the model at the identified contact point. To ensure a proper position and orientation with respect to the model, the asset can be placed such that the asset's pivot point coincides with the identified contact point, and such that the asset's asset normal matches the identified surface normal.

BRIEF DESCRIPTION OF THE DRAWINGS

The above and other aspects of the invention, its nature, and various features will be more apparent upon consideration of the following detailed description, taken in conjunction with the accompanying drawings in which like reference characters may refer to like parts, and in which.

DETAILED DESCRIPTION

Systems, methods, and computer-readable media for placing an asset on a three-dimensional model are provided and described with reference to FIGS. 1-11.

A three-dimensional model may be displayed to a user. The model can be customized by disposing assets on an external surface of the model. A user can select a particular point on the model for disposing an asset by selecting a contact point on an external surface of the model. The contact point can include a single point on the external surface of the model with respect to which the asset is to be placed. A surface normal that defines a line or vector that includes the contact point and that is perpendicular to a plane that is tangent to the external surface of the model at the contact point may then be determined.

Each asset can include a pivot point and an asset normal. The pivot point, which may be pre-defined for an asset, can include a specific point of the asset that is to be placed in a consistent positional relationship with respect to the particular contact point along an external surface of a model at which the asset is to be placed. The asset normal, which may also be pre-defined for an asset, can include a line or vector with respect to the pivot point or other point of the asset, and the asset normal may have a consistent orientational relationship with respect to a surface normal at any particular contact point along an external surface of a model at which the asset it to be placed. An asset may be placed on a model such that the pivot point of the asset may coincide with the contact point along the surface of the model, and such that the asset normal of the asset may match the surface normal at the contact point.

Figure 1:
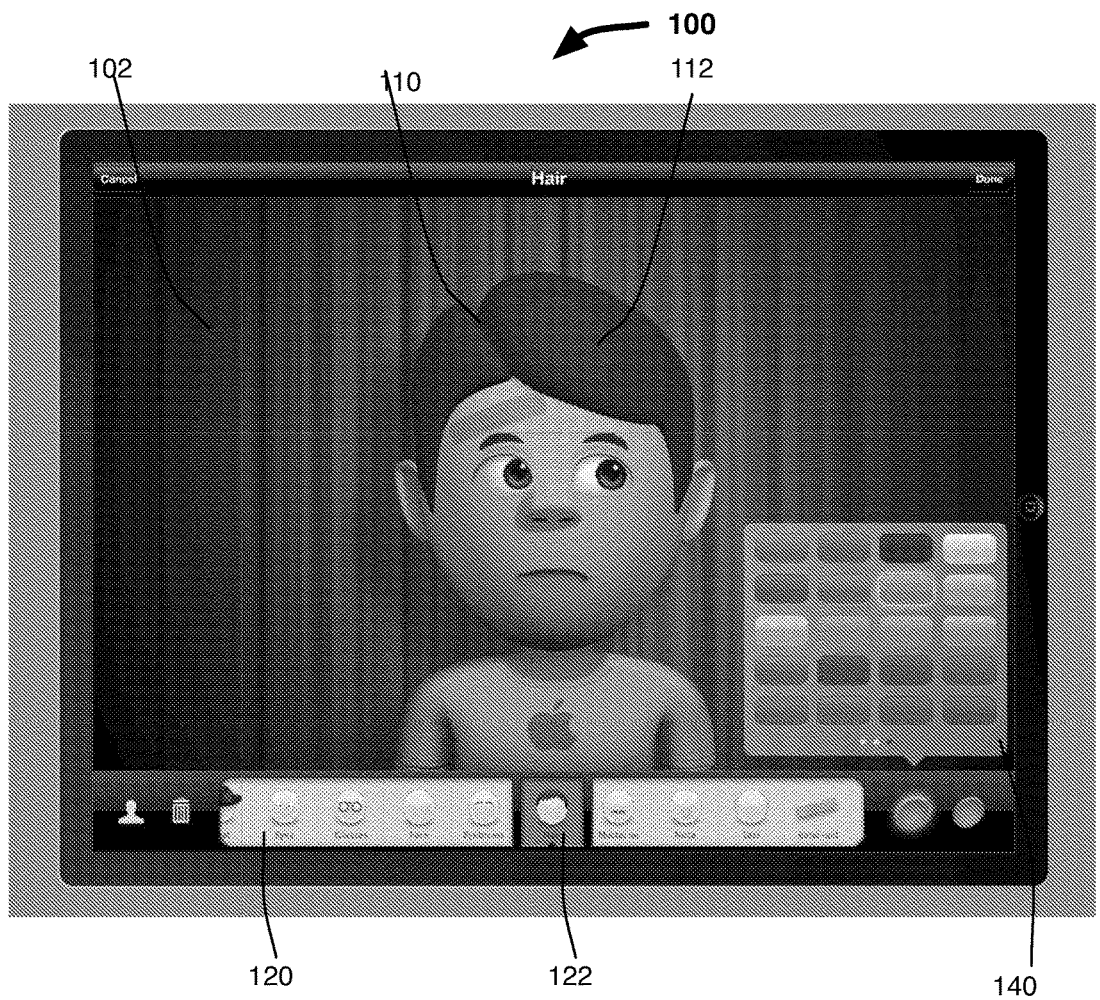
FIG. 1 is an illustrative display of a three-dimensional model displayed by an electronic device in accordance with some embodiments of the invention.
Figure 2A:
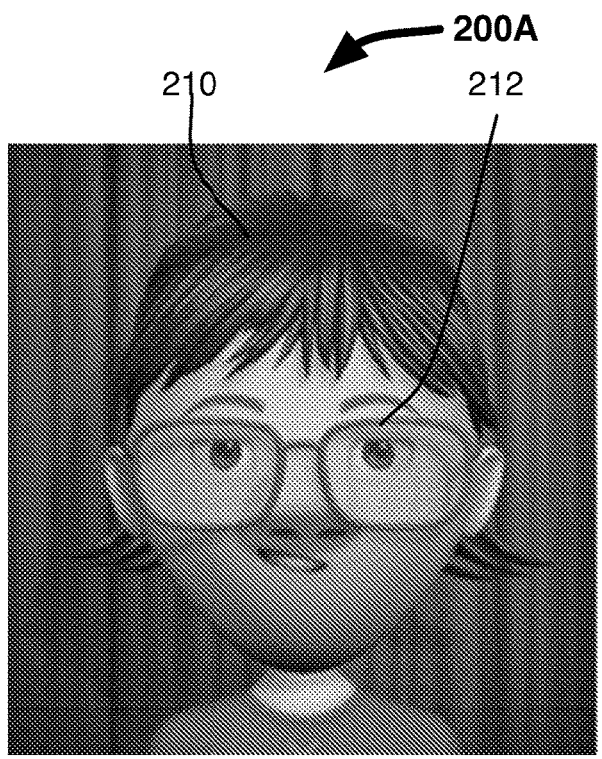
FIGS. 2A and 2B are illustrative views of an asset placed at different positions and orientations on a three-dimensional model in accordance with some embodiments of the invention.
Figure 2B:
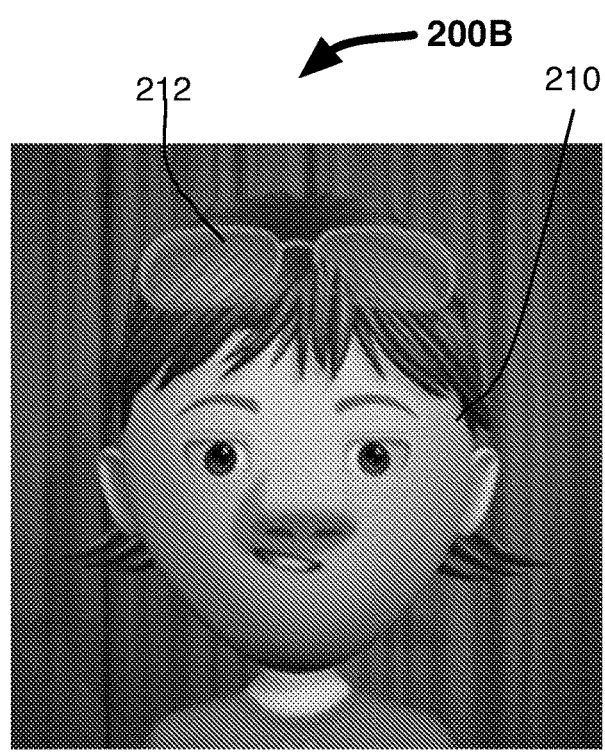

An electronic device can display different content for enjoyment by a user. In some cases, an electronic device can display a three-dimensional model as part of an application operating on the device. FIG. 1 is an illustrative display of a three-dimensional model in accordance with some embodiments of the invention. Display 100, provided by electronic device 190, can include model 110 provided in front of background 102. Model 110 can represent any suitable object including, for example, a person, an animal, a place, or a thing (e.g., an imaginary being). In some cases, model 110 can include an avatar. A user can create model 110 by selecting assets from asset bar 120, and positioning specific assets on the model. The assets can include, for example, a face, mouth, eyes, ears, nose, mustache, beard, hair, eyebrows, glasses, hats, accessories (e.g., jewelry or band-aids), clothing, or other components that can be included on or integrated into a model. The assets can be provided from a source of assets (e.g., a library of assets that may be stored locally on or remotely from electronic device 190).

When a user selects an asset type on asset bar 120 such as, for example, hair asset type 122, device 190 can display a menu or listing of one or more different hair options (not shown). The user can select one of the hair options to be applied to the model (e.g., as hair asset 112). A user can select any suitable number of options associated with a single asset to place on a model (e.g., asset size, shape, style, etc.). For example, a user can select different colors for an asset. As shown in FIG. 1, to change a color of hair asset 112, a user can select one of the color options provided by color menu 140 of asset bar 120.

In some embodiments, a user can customize the model by moving an asset to different placements with respect to the rest of the model. In the example of display 200 of model 210 in FIGS. 2A and 2B, respective displays 200A and 200B of model 210 can include glasses asset 212 in two different placements (e.g., on the bridge of the nose of model 210 of FIG. 2A, and on the forehead of model 210 of FIG. 2B). The user can move asset 212 using any suitable approach including, for example, by dragging asset 212 with respect to model 210, or by using directional instructions (e.g., directional keys of an input interface).

As an asset moves, the position and orientation of the asset can remain consistent relative to the remainder of the model. For example, a particular point of the asset (e.g., an asset pivot point) may remain in contact with an external surface of the model (e.g., a particular point of glasses asset 212 may be positioned in contact with the surface of the face of model 210 in FIG. 2A and in contact with the surface of the hair of model 210 in FIG. 2B). In addition, the asset may maintain a consistent orientation relative to an external surface of the model (e.g., glasses asset 212 may be oriented such that the eye pieces of the glasses asset are in a plane that is co-planar with a plane tangent to the model at the contact point of asset 212 with model 210). Different approaches can be used to determine a proper position and orientation of an asset relative to a model, and to maintain the proper position and orientation when the asset is moved.

Figure 3:
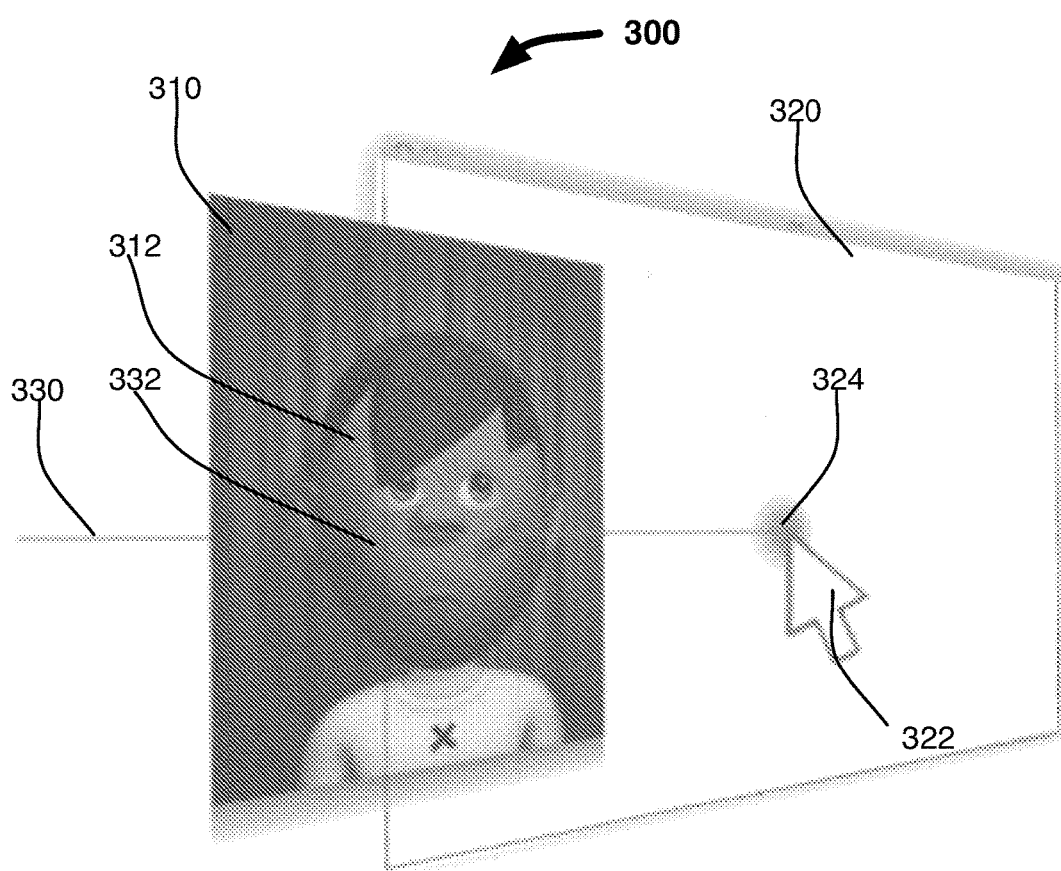
FIG. 3 is an illustrative representation for identifying a contact point on a model in accordance with some embodiments of the invention.

An electronic device can determine a point on a model at which to place an asset using any suitable approach. In some cases, an electronic device can identify an input point at which a user instructs the device to place an asset. FIG. 3 is an illustrative representation for identifying a contact point on a model in accordance with some embodiments of the invention. An electronic device can provide model 310 for display in display window 320 (e.g., a display window of the device). A user can provide an input to the device to identify a specific position at which to place an asset. For example, a user can move cursor 322 provided by the device on display 320 to a specific input position 324 on display 320. As another example, a user can provide a direct input (e.g., a touch input) identifying a specific location on display 320 (e.g., by touching display 320 at input position 324). Input position 324 can be identified, for example, using coordinates corresponding to display 320 of the device.

Once input position 324 has been identified, the electronic device can identify contact point 332 on external surface 312 of model 310 at which to place an asset. Contact point 332 can correspond to input position 324 in one of many suitable ways. For example, the electronic device can project imaginary line 330 passing through input position 324 and perpendicular to window 320. As another example, the electronic device can determine an arbitrary, expected, or actual eye position of the user, and may define imaginary line 330 passing through the determined eye position and through input position 324. The electronic device can then identify contact point 332 as the point on external surface 312 at which imaginary line 330 first intersects with surface 312. Therefore, the particular location of contact point 332 may depend, for example, on a depth of model 310 relative to window 320.

Figure 4:
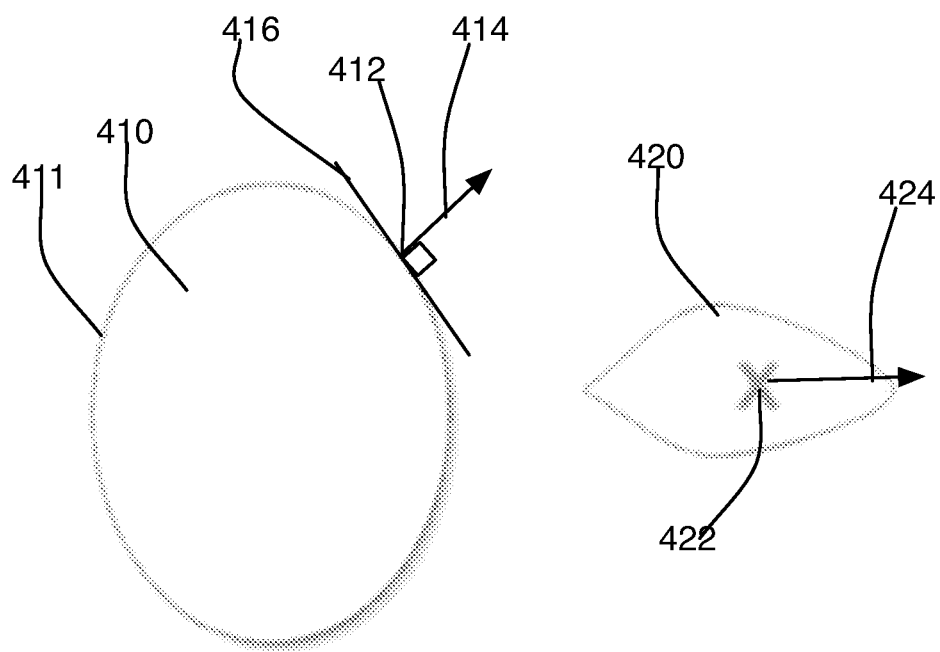
FIG. 4 is a schematic view of a model and an asset in accordance with some embodiments of the invention.

Once the electronic device has identified the contact point on the surface of the model at which to place an asset, the electronic device can establish a surface normal that may be oriented perpendicular to the surface of the model at the identified contact point. FIG. 4 is a schematic view of a model and an asset in accordance with some embodiments of the invention. Model 410 can include external surface 411 defining an outer surface of the model, and on which contact point 412 for an asset can be identified. For example, contact point 412 can be identified based on an identified input position provided by a user (e.g., input position 324, FIG. 3). Using identified contact point 412, an electronic device can identify tangent plane 416 that may include contact point 412 and that may be tangent to external surface 411 at contact point 412 (e.g., if external surface 411 is curved). If external surface 411 is not curved in the vicinity of contact point 412, external surface 411 can serve as plane 416. As shown, tangent plane 416 may also extend within a plane perpendicular to the drawing sheet of FIG. 4. To identify tangent plane 416, the electronic device can identify surface normal 414 that may extend perpendicular to tangent plane 416 and through contact point 414. Surface normal 414 can be quantified as a vector having a starting point and an end point in a coordinate system established by the device.

Asset 420, selected by a user to be placed on model 410 at contact point 412, can include features for positioning and orienting the asset. In particular, asset 420 can include pivot point 422 and asset normal 424. Pivot point 422 and/or asset normal 424 can be provided as pre-defined metadata associated with asset 420. Pivot point 422 can correspond to a point of asset 420 that is to be placed in contact with external surface 411 of model 410. Pivot point 422 can correspond to any suitable portion of asset 420 including, for example, a barycenter or center of gravity of the asset. Alternatively, pivot point 422 may be a point distanced from a physical or material portion of asset 420. For example, if asset 420 is a ring-shaped angelic halo to be suspended above the head of a model, then pivot point 422 may be removed from the ring-like structure by a distance equal to the distance at which the halo asset is to be suspended away from (e.g., above) the model. The pivot point can include a specific point of the asset that is to be placed in a consistent positional relationship with respect to the particular contact point along an external surface of a model at which the asset it to be placed. For example, in the case of a glasses asset, the pivot point can be a point on the bridge between the eyepieces of the glasses. In the case of an earring asset, the pivot point can be selected as a point on a branch of the earring to be passed through an ear.

In addition to including pivot point 422, asset 420 can include asset normal 424 that may define an orientation for displaying asset 420 on model 410. In particular, an artist can define asset normal 424 to indicate a direction or orientation in which asset 420 is to be placed on a model relative to a line that is perpendicular to an external surface of the model and that includes the identified contact point. Asset normal 424 can be defined using any suitable approach including, for example, as a vector between two points in space. For example, asset normal 424 can include a line or vector with respect to pivot point 422, and asset normal 424 may have a consistent orientational relationship with respect to a surface normal at any particular contact point along an external surface of a model on which the asset it to be placed.

Figure 5:
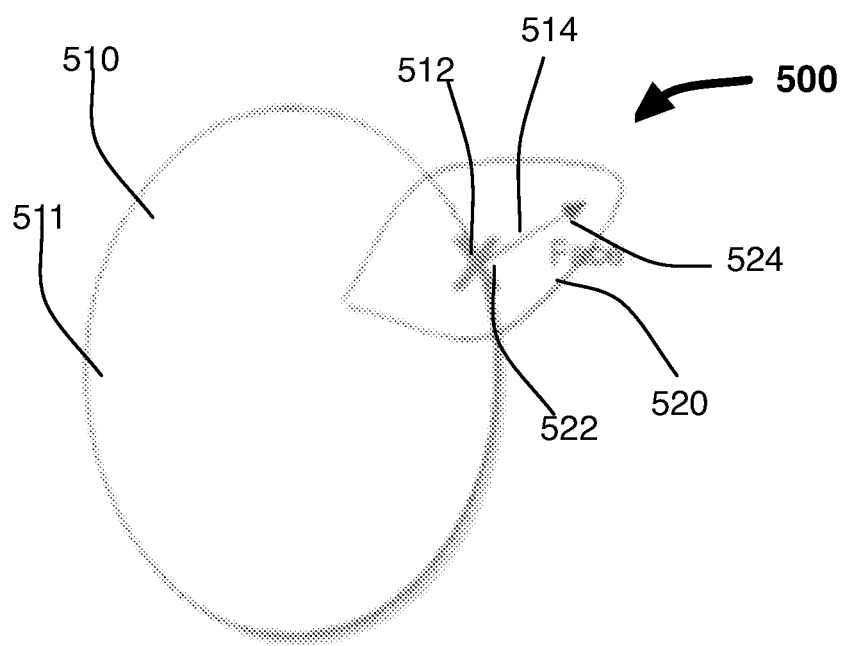
FIG. 5 is a schematic view of a model on which an asset is placed in accordance with some embodiments of the invention.

To place an asset on a model, an electronic device can display the asset such that the asset's pivot point may coincide with the identified contact point on the surface of the model, and such that the asset normal of the asset may matches the surface normal. FIG. 5 is a schematic view of a model on which an asset is placed in accordance with some embodiments of the invention. Model 510 can include contact point 512 on a model surface 511 and surface normal 514, which may be identified as described with respect to contact points 312 and 412 and surface normal 414. Asset 520 can include pivot point 522 and asset normal 524 for determining the positioning and orientation of asset 520 on model 510. An electronic device can position asset 520 such that pivot point 522 may coincide with or becomes concurrent with contact point 512. In addition, the electronic device can orient asset 520 such that asset normal 524 may match or may be aligned with surface normal 514. This particular placement can ensure that asset 520 may be positioned and oriented one model 510 in a consistent manner, as may be expected by the artist and by the end user, regardless of the position of contact point 512 with respect to the shape of model surface 511.

Figure 6A:
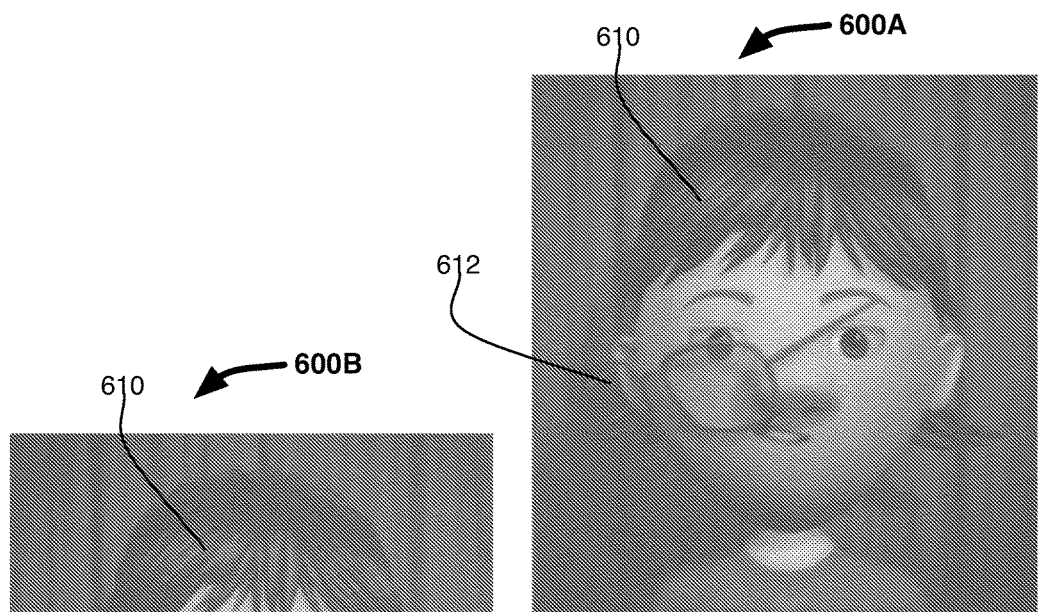
FIGS. 6A-6C are illustrative displays of an asset placed at different positions and orientations on a three-dimensional model in accordance with some embodiments of the invention.
Figure 6B:
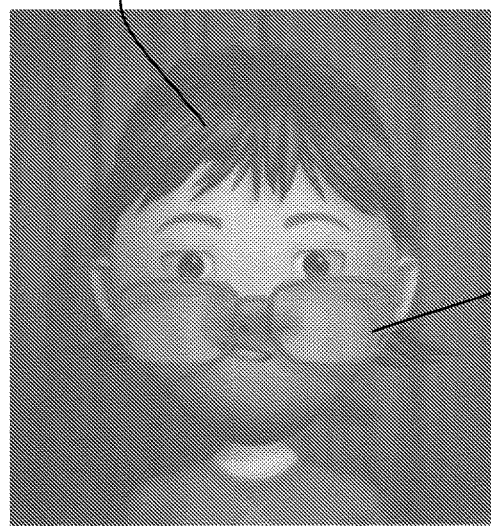
Figure 6C:
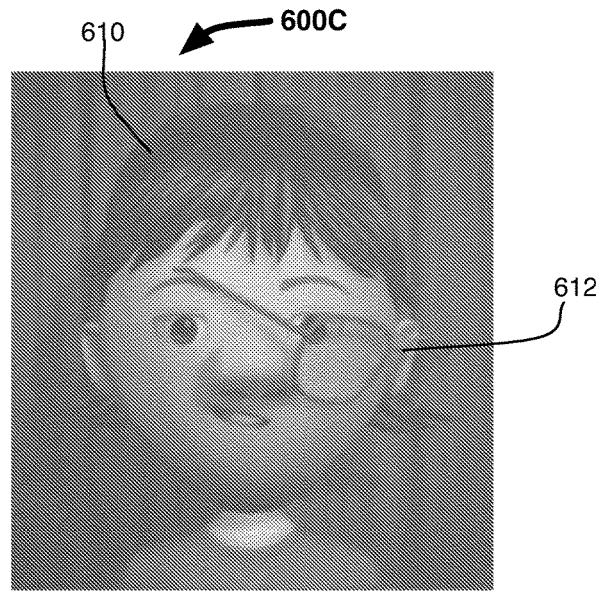

In some cases, an asset can be positioned and oriented such that some portions of the asset can intersect with the external surface of a model. For example, portions of an asset that extend past an external surface of a model can be hidden from view of the user by the model. FIGS. 6A-6C are illustrative views of respective displays 600A-600C of an asset placed at different contact points on a model in accordance with some embodiments of the invention. Based on these different contact points of asset 612 with respect to model 610, different portions of asset 612 may be visible to a user when the orientation of model 610 with respect to the user is maintained as shown in FIGS. 6A-6C. For example, different portions or amounts of eyeglasses asset 612 may be visible in displays 600A-600C of FIGS. 6A and 6C.

Using an interface, a user can move an asset displayed on a model by defining a new contact point on the external surface of the model. For example, a user can select an asset, and provide an input to an electronic device for identifying a new contact point (e.g., the user can select and drag the asset on a display window to identify a new contact point for the asset on the model). In response to defining a new contact point, the electronic device can re-draw the asset on the model such that the pivot point of the asset matches the new contact point. If the electronic device detects a sequence of new contact points (e.g., as the user drags the asset), the electronic device can display the asset in a succession of placements corresponding to the sequence of new contact points.

In addition to changing the contact points of the asset on the model, the electronic device can determine how to orient the asset at each new contact point. In some cases, the electronic device can identify a new surface normal corresponding to each new contact point, and may orient the asset such that the asset normal matches the new surface normal. If the electronic device detects a sequence of new contact points and identifies a corresponding sequence of new surface normals, the electronic device can orient the asset at each identified new contact point using the corresponding new surface normal. For example, a user can drag asset 612 from the placement shown in display 600A of FIG. 6A to the placement shown in display 600C of FIG. 6C passing through the placement shown in display 600B of FIG. 6B.

Figure 7:
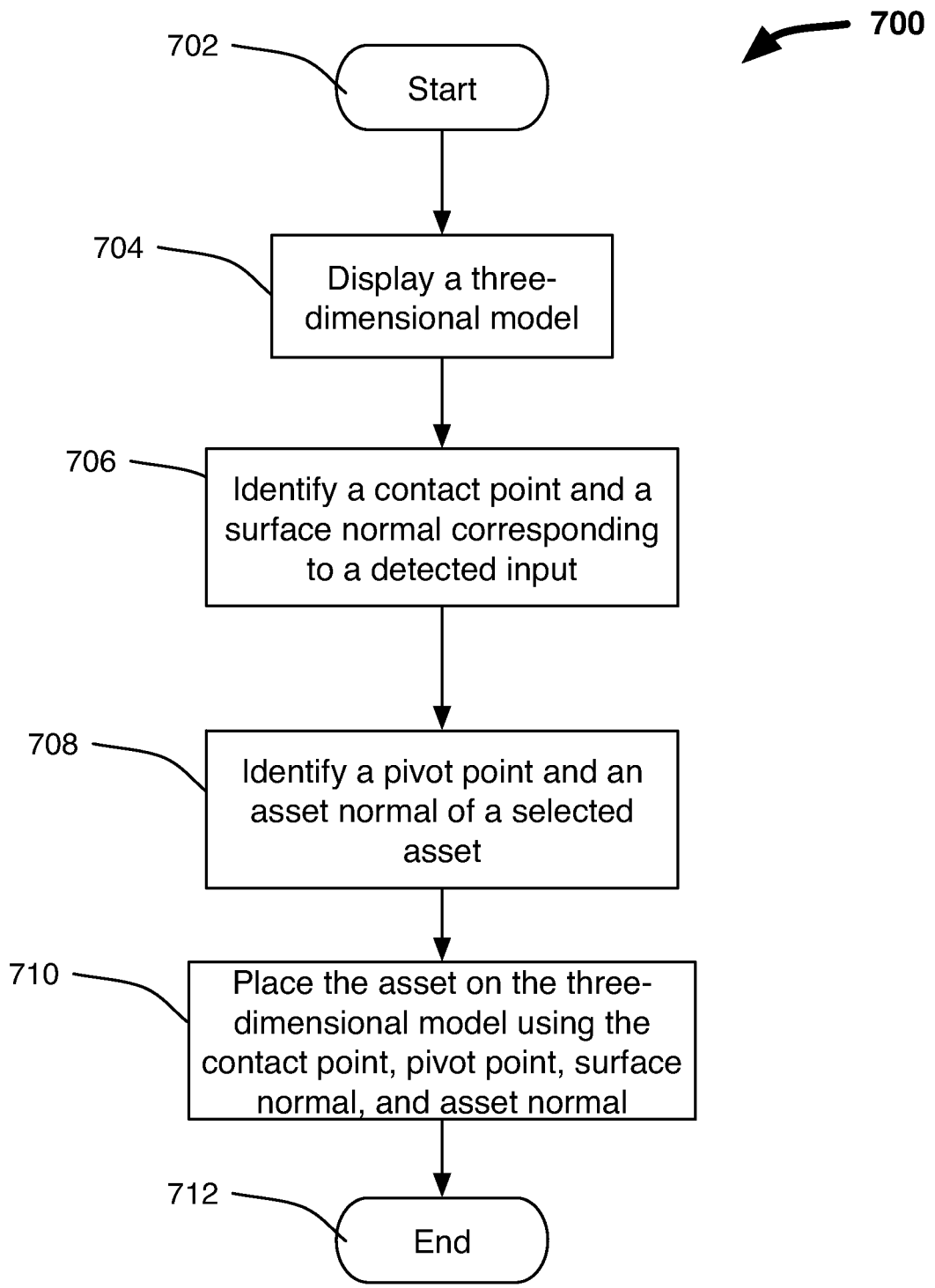
FIG. 7 is a flowchart of an illustrative process for determining a position and orientation of an asset on a three-dimensional model in accordance with some embodiments of the invention.

FIG. 7 is a flowchart of an illustrative process for placing an asset on a model in accordance with some embodiments of the invention. Process 700 can begin at step 702. At step 704, the electronic device can display a three-dimensional model, such as an avatar. At step 706, the electronic device can identify a contact point and a surface normal that correspond to a detected user input. For example, the electronic device can detect an input provided by a user of the device, and can define an imaginary line extending to the three-dimensional model from a position of the detected input. The point of intersection of the line with the model can be defined as the contact point. The electronic device can also identify a vector that is normal to an external surface of the model at the contact point. At step 708, the electronic device can identify a pivot point and an asset normal of an asset selected by a user for placement on the three-dimensional model at the contact point. For example, the electronic device can identify a particular asset selected by a user to place on the three-dimensional model, and can then identify pivot point and an asset normal associated with the particular asset. For example, a pivot point and an asset normal may be defined for an asset by an artist creating the asset. At step 710, the electronic device can place the asset on the three-dimensional model using the contact point, pivot point, surface normal, and asset normal. In particular, the electronic device can place the asset on the model such that the contact point and the pivot point may coincide with one another, and such that the asset normal may match the surface normal. For example, the pivot point of the asset may be positioned at the identified contact point and the asset normal of the asset may be oriented along the identified surface normal. Process 700 can then end at step 712.

Figure 8:
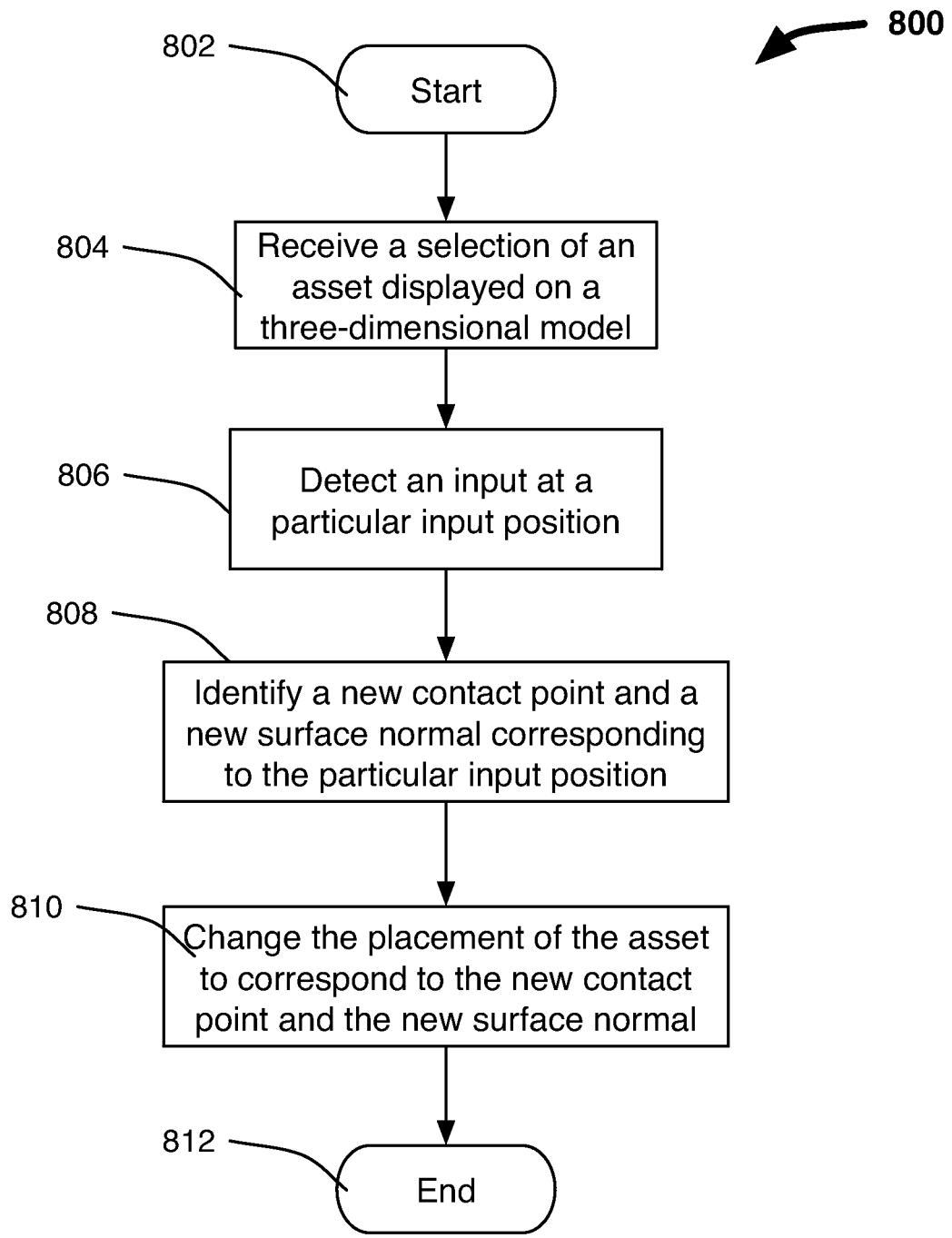
FIG. 8 is a flowchart of an illustrative process for changing a position and orientation of an asset on a three-dimensional model in accordance with some embodiments of the invention.

FIG. 8 is a flowchart of an illustrative process for changing a placement of an asset on a model in accordance with some embodiments of the invention. Process 800 can begin at step 802. At step 804, an electronic device can receive a selection of an asset displayed on a three-dimensional model. The asset can include a pivot point and an asset normal used to position and orient the asset on the three-dimensional model. At step 806, the electronic device can detect an input at a particular input position, for example, as a touch input or as a cursor position on a display. At step 808, the electronic device can identify a new contact point and a new surface normal corresponding to the particular input position. For example, the electronic device can define a line extending from the particular input position towards the three-dimensional model, and can define the new contact point as the intersection of the line with an external surface of the model. In some cases, the electronic device can identify a sequence of contact points when a sequence of inputs is detected (e.g., as a user drags a cursor across a screen). At step 810, the electronic device can change the placement of the asset on the model to correspond to the new contact point and to the new surface normal. For example, the electronic device can change the placement of the asset such that the pivot point of the asset matches the new contact point, and such that the asset normal of the asset matches the new surface normal. If a sequence of inputs is detected, the electronic device can identify a sequence of placements for the asset. Process 800 can end at step 812.

Figure 9:
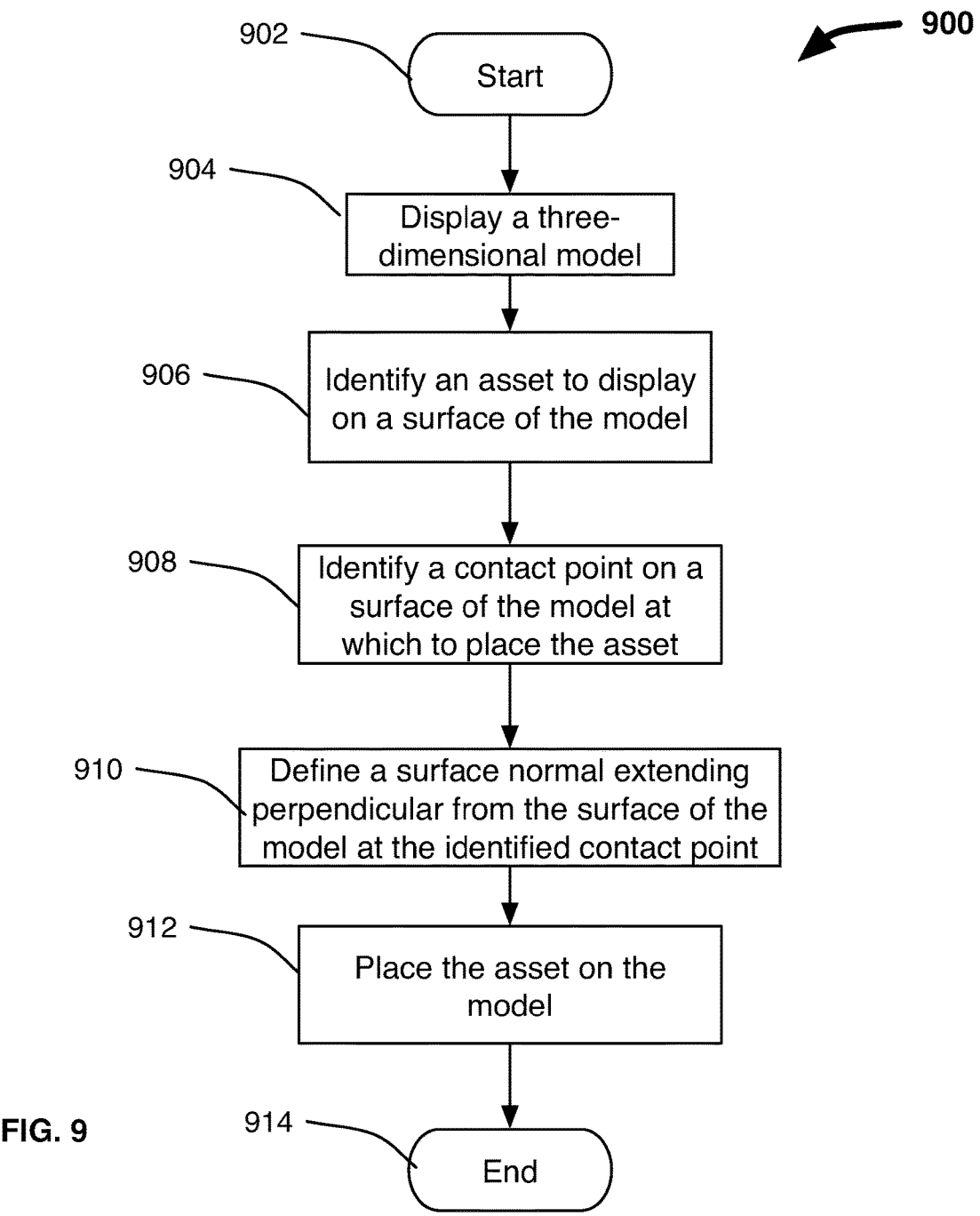
FIG. 9 is a flowchart of an illustrative process for orienting an asset on a three-dimensional model in accordance with some embodiments of the invention.

FIG. 9 is a flowchart of an illustrative process for placing an asset on a three-dimensional model in accordance with some embodiments of the invention. Process 900 can begin at step 902. At step 904, an electronic device can display a three-dimensional model (e.g., display an avatar). At step 906, an asset to display on a surface of the model is identified. For example, a user can select an asset to display on the model. The asset can include a pivot point and an asset normal. At step 908, the electronic device can identify a contact point on a surface of the model at which to place the asset. In some cases, the contact point can correspond to an input position provided by a user. At step 910, the electronic device can define a surface normal extending perpendicular from the surface of the model at the identified contact point. For example, the electronic device can identify a plane tangent to the surface of the model at the contact point, and can define a vector perpendicular to the plane to serve as the surface normal. At step 912, the electronic device can place the asset on the model, for example, such that the pivot point is concurrent or coincides with the contact point, and such that the asset normal matches the surface normal. This can ensure that the asset is properly positioned and oriented on the model. Process 900 can end at step 914.

Figure 10:
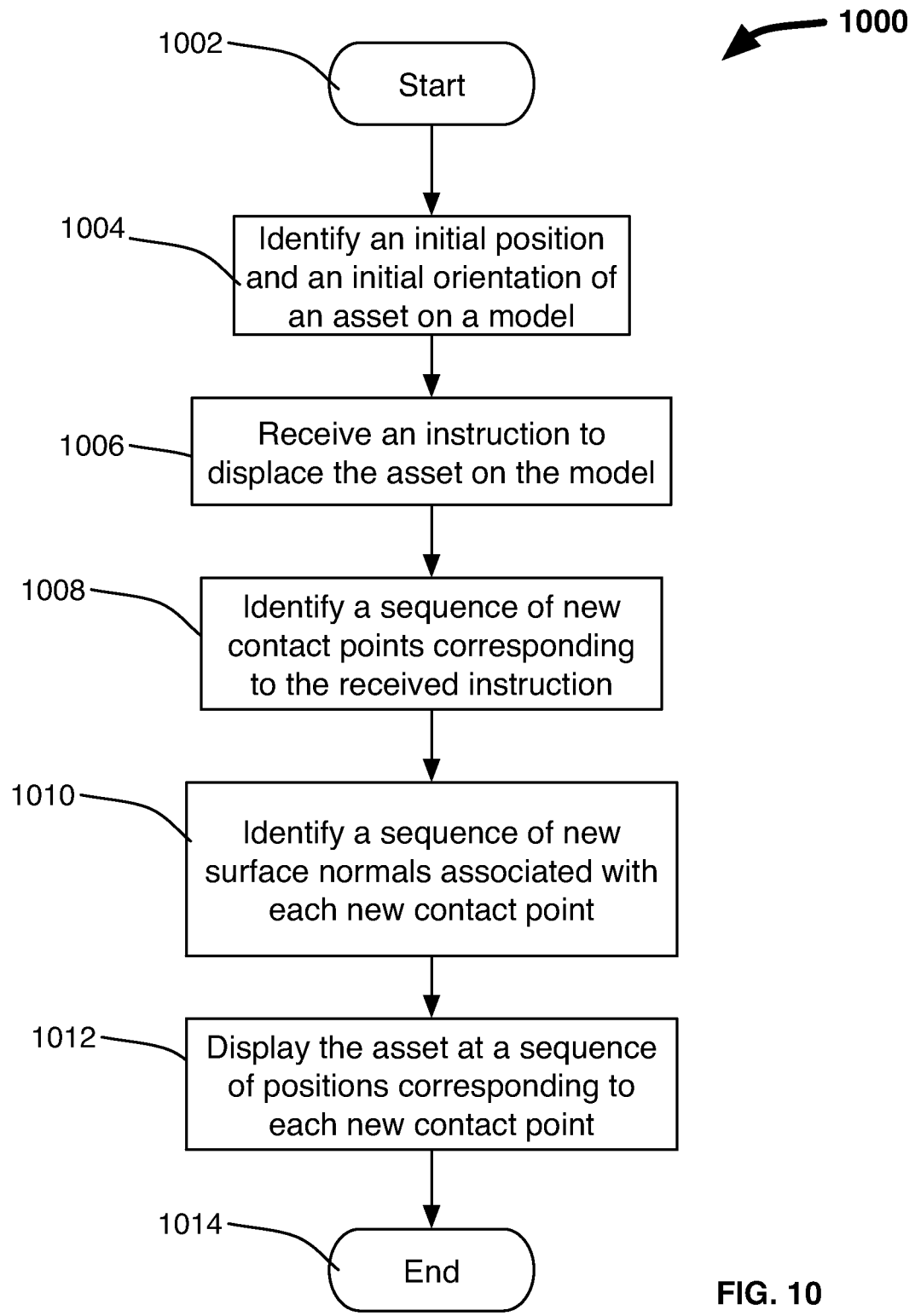
FIG. 10 is a flowchart of an illustrative process for displacing an asset displayed on a three-dimensional model in accordance with some embodiments of the invention.

FIG. 10 is a flowchart of an illustrative process for displacing an asset displayed on a three-dimensional model in accordance with some embodiments of the invention. Process 1000 can begin at step 1002. At step 1004, an electronic device can identify an initial position and an initial orientation of an asset on a three-dimensional model. The initial position can be determined from an initial contact point of the asset on the model (e.g., by the initial position of the asset's pivot point) and the initial orientation can be determined from an initial surface normal extending perpendicular from a surface of the model at the determined initial contact point. At step 1006, the electronic device can receive an instruction to displace the asset on the three-dimensional model. At step 1008, the electronic device can identify a single new contact point or a sequence of new contact points corresponding to the received instruction. For example, the electronic device can identify a sequence of new contact points corresponding to the dragging of the asset to a new placement on the model. At step 1010, the electronic device can identify a sequence of new surface normals associated with respective new contact points of the sequence of new contact points. Each new surface normal can include a vector perpendicular a plane tangent to the surface of the model at an associated new contact point of the sequence of new contact points. At step 1012, the electronic device can display the asset at a sequence of new positions corresponding to the sequence of new contact points. The asset may also be displayed at a sequence of new orientations corresponding to the sequence of new surface normals, each of which may be associated with a respective new contact point of the sequence of new contact points. Process 1000 can then end at step 1014.

Figure 11:
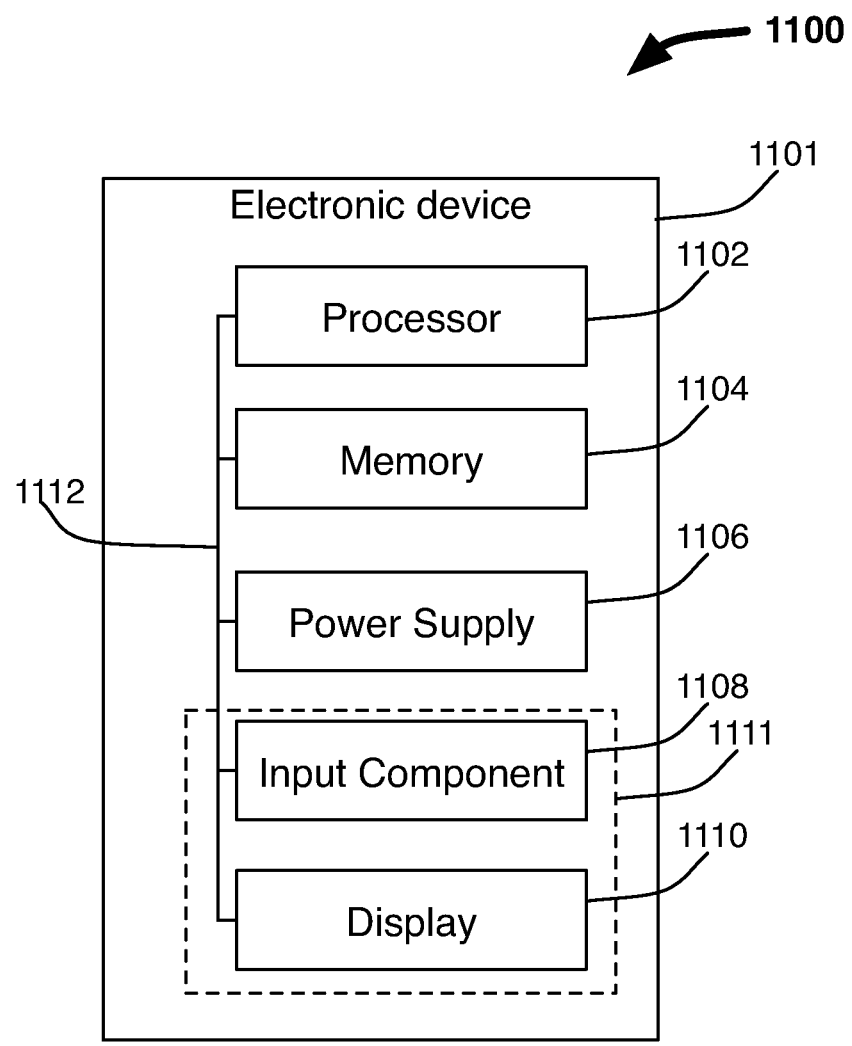
FIG. 11 is a schematic view of an illustrative electronic device for displaying a three-dimensional model with an asset in accordance with some embodiments of the invention.

Any suitable electronic device can be used to display an asset on a three-dimensional model. FIG. 11 is a schematic view of an illustrative electronic device 1100 for displaying a three-dimensional model with an asset in accordance with some embodiments of the invention. Electronic device 1100 may be any portable, mobile, or hand-held electronic device configured to present a three-dimensional model or an asset to a user wherever the user travels. Alternatively, electronic device 1100 may not be portable at all, but may instead be generally stationary. Electronic device 1100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 1100 may perform a single function (e.g., a device dedicated to presenting visual content) and, in other embodiments, electronic device 1100 may perform multiple functions (e.g., a device that presents visual content, plays music, and receives and transmits telephone calls).

Electronic device 1100 may include a processor 1102, memory 1104, power supply 1106, input interface or component 1108, and display 1110. Electronic device 1100 may also include a bus 1112 that may provide one or more wired or wireless communication links or paths for transferring data and/or power to, from, or between various other components of device 1100. In some embodiments, one or more components of electronic device 1100 may be combined or omitted. Moreover, electronic device 1100 may include other components not combined or included in FIG. 11 and/or several instances of one or more of the components shown in FIG. 11.

Memory 1104 may include one or more storage mediums, including for example, a hard-drive, flash memory, non-volatile memory, permanent memory such as read-only memory ("ROM"), semi-permanent memory such as random access memory ("RAM"), any other suitable type of storage component, or any combination thereof. Memory 1104 may include cache memory, which may be one or more different types of memory used for temporarily storing data for electronic device application programs. Memory 1104 may store media data (e.g., music and image files), software (e.g., a boot loader program, one or more application programs of an operating system for implementing functions on device 1100, etc.), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 1100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Power supply 1106 may provide power to one or more of the components of device 1100. In some embodiments, power supply 1106 can be coupled to a power grid (e.g., when device 1100 is not a portable device, such as a desktop computer). In some embodiments, power supply 1106 can include one or more batteries for providing power (e.g., when device 1100 is a portable device, such as a cellular telephone). As another example, power supply 1106 can be configured to generate power from a natural source (e.g., solar power using solar cells).

One or more input components 1108 may be provided to permit a user to interact or interface with device 1100. For example, input component 1108 can take a variety of forms, including, but not limited to, an electronic device pad, dial, click wheel, scroll wheel, touch screen, one or more buttons (e.g., a keyboard), mouse, joy stick, track ball, microphone, camera, proximity sensor, light detector, and combinations thereof. Each input component 1108 can be configured to provide one or more dedicated control functions for making selections or issuing commands associated with operating device 1100.

Electronic device 1100 may also include one or more output components that may present information (e.g., visual, audible, and/or tactile information) to a user of device 1100. An output component of electronic device 1100 may take various forms, including, but not limited to, audio speakers, headphones, audio line-outs, visual displays, antennas, infrared ports, rumblers, vibrators, or combinations thereof.

For example, electronic device 1100 may include display 1110 as an output component. Display 1110 may include any suitable type of display or interface for presenting visual content to a user. In some embodiments, display 1110 may include a display embedded in device 1100 or coupled to device 1100 (e.g., a removable display). Display 1110 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 1110 can include a movable display or a projecting system for providing a display of content on a surface remote from electronic device 1100, such as, for example, a video projector, a head-up display, or a three-dimensional (e.g., holographic) display. As another example, display 1110 may include a digital or mechanical viewfinder, such as a viewfinder of the type found in compact digital cameras, reflex cameras, or any other suitable still or video camera. In some embodiments, display 1110 may include display driver circuitry, circuitry for driving display drivers, or both. Display 1110 can be operative to present visual content provided by device 1100 (e.g., an avatar constructed from several assets).

It should be noted that one or more input components and one or more output components may sometimes be referred to collectively herein as an input/output ("I/O") interface (e.g., input component 1108 and display 1110 as I/O interface 1111). It should also be noted that input component 1110 and display 1110 may sometimes be a single I/O component, such as a touch screen that may receive input information through a user's touch of a display screen and that may also provide visual information to a user via that same display screen.

Electronic device 1100 may also be provided with an enclosure or housing 1101 that may at least partially enclose one or more of the components of device 1100 for protecting them from debris and other degrading forces external to device 1100. In some embodiments, one or more of the components may be provided within its own housing (e.g., input component 1110 may be an independent keyboard or mouse within its own housing that may wirelessly or through a wire communicate with processor 1102, which may be provided within its own housing).

Processor 1102 of device 1100 may include any processing or control circuitry operative to control the operations and performance of one or more components of electronic device 1100. For example, processor 1102 may be used to run operating system applications, firmware applications, media playback applications, media editing applications, or any other application. In some embodiments, processor 1102 may receive input signals from input component 1108 and/or drive output signals through display 1110.

It is to be understood that the steps shown in each one of processes 700-1000 of FIGS. 7-10, respectively, are merely illustrative and that existing steps may be modified or omitted, additional steps may be added, and the order of certain steps may be altered.

Moreover, the processes described with respect to FIGS. 7-10, as well as any other aspects of the invention, may each be implemented in hardware or a combination of hardware and software. Embodiments of the invention can also be embodied as computer readable code on a computer readable medium. The computer readable medium may be any data storage device that can store data which can thereafter be read by a computer system. Examples of the computer readable medium include read-only memory ("ROM"), random-access memory ("RAM"), CD-ROMs, DVDs, magnetic tape, and optical data storage devices. The computer readable medium can also be distributed over network-coupled computer systems so that the computer readable code may be stored and executed in a distributed fashion.

Although many of the embodiments of the present invention are described herein with respect to personal computing devices, it should be understood that the present invention is not limited to personal computing applications, but is generally applicable to other applications.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The above-described embodiments of the invention are presented for purposes of illustration and not of limitation.

What is claimed is:

1. A method comprising:
identifying a contact point on a surface of a model at which to place an asset;
identifying a surface normal extending perpendicular from the surface of the model at the identified contact point;
positioning a pivot point of the asset at the identified contact point, wherein the pivot point of the asset corresponds to the center of gravity of the asset; and
orienting the asset normal of the asset at the identified surface normal.

2. The method of claim 1, further comprising:
receiving a selection of a new contact point;
identifying a new surface normal extending perpendicular from the surface of the model at the identified new contact point; and
re-placing the asset on the model using the new contact point and the new surface normal.

3. The method of claim 1, wherein:
the surface normal extends perpendicular to a plane that is tangent to the surface of the model at the identified contact point.

4. The method of claim 1, further comprising:
receiving an input identifying a position on a display; and
defining an imaginary line extending from the identified position on the display, wherein the identifying the contact point comprises identifying the contact point at an intersection of the imaginary line and the surface of the model.

5. The method of claim 4, wherein identifying the contact point further comprises:
identifying the intersection of the imaginary line and the surface of the model that is closes to the display.

6. The method of claim 4, wherein the defining the imaginary line comprises:
defining a line perpendicular to a plane of the display.

7. The method of claim 4, wherein the defining the imaginary line comprises:
establishing an eye position of a user; and
defining a line passing through the established eye position and through the identified position on the display.

8. A system comprising:
one or more processors; and
a non-transitory computer-readable medium including one or more sequences of instructions that, when executed by one or more processors, causes:
identifying a contact point on a surface of a model at which to place an asset;
identifying a surface normal extending perpendicular from the surface of the model at the identified contact point;
positioning a pivot point of the asset at the identified contact point, wherein the pivot point of the asset corresponds to the center of gravity of the asset; and
orienting the asset normal of the asset at the identified surface normal.

9. The system of claim 8, further comprising:
receiving a selection of a new contact point;
identifying a new surface normal extending perpendicular from the surface of the model at the identified new contact point; and
re-placing the asset on the model using the new contact point and the new surface normal.

10. The system of claim 8, wherein:
the surface normal extends perpendicular to a plane that is tangent to the surface of the model at the identified contact point.

11. The system of claim 8, further comprising:
receiving an input identifying a position on a display; and
defining an imaginary line extending from the identified position on the display, wherein the identifying the contact point comprises identifying the contact point at an intersection of the imaginary line and the surface of the model.

12. The system of claim 11, wherein identifying the contact point further comprises:
identifying the intersection of the imaginary line and the surface of the model that is closes to the display.

13. The system of claim 11, wherein the defining the imaginary line comprises:
defining a line perpendicular to a plane of the display.

14. The system of claim 11, wherein the defining the imaginary line comprises:
establishing an eye position of a user; and
defining a line passing through the established eye position and through the identified position on the display.

15. A non-transitory computer-readable medium including one or more sequences of instructions that, when executed by one or more processors, causes:
identifying a contact point on a surface of a model at which to place an asset;
identifying a surface normal extending perpendicular from the surface of the model at the identified contact point;
positioning a pivot point of the asset at the identified contact point, wherein the pivot point of the asset corresponds to the center of gravity of the asset; and
orienting the asset normal of the asset at the identified surface normal.

16. The non-transitory computer-readable medium of claim 15, further comprising:
receiving a selection of a new contact point;
identifying a new surface normal extending perpendicular from the surface of the model at the identified new contact point; and
re-placing the asset on the model using the new contact point and the new surface normal.

17. The non-transitory computer-readable medium of claim 15, wherein:
the surface normal extends perpendicular to a plane that is tangent to the surface of the model at the identified contact point.

18. The non-transitory computer-readable medium of claim 15, further comprising:
receiving an input identifying a position on a display; and
defining an imaginary line extending from the identified position on the display, wherein the identifying the contact point comprises identifying the contact point at an intersection of the imaginary line and the surface of the model.

19. The non-transitory computer-readable medium of claim 18, wherein identifying the contact point further comprises:
identifying the intersection of the imaginary line and the surface of the model that is closes to the display.

20. The non-transitory computer-readable medium of claim 18, wherein the defining the imaginary line comprises:
defining a line perpendicular to a plane of the display.

21. The non-transitory computer-readable medium of claim 18, wherein the defining the imaginary line comprises:
establishing an eye position of a user; and
defining a line passing through the established eye position and through the identified position on the display.

* * * * *